US012461035B2

(12) United States Patent
Birkel et al.

(10) Patent No.: US 12,461,035 B2
(45) Date of Patent: Nov. 4, 2025

(54) RAMAN SPECTROSCOPY SYSTEM FOR EXTREME CONDITIONS

(71) Applicants: Christina S. Birkel, Phoenix, AZ (US); John Jamboretz, Phoenix, AZ (US); Andreas Reitz, Tempe, AZ (US)

(72) Inventors: Christina S. Birkel, Phoenix, AZ (US); John Jamboretz, Phoenix, AZ (US); Andreas Reitz, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 235 days.

(21) Appl. No.: 18/463,578

(22) Filed: Sep. 8, 2023

(65) Prior Publication Data
US 2024/0085334 A1    Mar. 14, 2024

Related U.S. Application Data

(60) Provisional application No. 63/405,181, filed on Sep. 9, 2022.

(51) Int. Cl.
*G01J 3/44* (2006.01)
*G01N 1/44* (2006.01)
*G01N 21/65* (2006.01)

(52) U.S. Cl.
CPC ............... *G01N 21/65* (2013.01); *G01N 1/44* (2013.01); *G01N 2201/08* (2013.01)

(58) Field of Classification Search
CPC ...... G01N 21/65; G01N 1/44; G01N 2201/08; G01N 2201/122; G01J 3/44; A61B 5/0075
See application file for complete search history.

(56) References Cited

U.S. PATENT DOCUMENTS 3,687,047 A * 8/1972 Ito ........................... G03B 9/07
                                                         396/509
3,761,935 A * 9/1973 Silbiger ................... H01Q 3/18
                                                         343/754

(Continued)

FOREIGN PATENT DOCUMENTS

JP           H11318812 A  * 11/1999  ......... G02B 23/2423

OTHER PUBLICATIONS

Whittaker, A. Harrison, G. S. Oakley, I. D. Youngson, R. K. Heenan, S. M. King, "Preliminary experiments on apparatus for in situ studies of microwave-driven reactions by small angle neutron scattering," Rev. Sci. Instrum. 2001, 72, 173-176.

(Continued)

*Primary Examiner* — Abdullahi Nur
(74) *Attorney, Agent, or Firm* — Fish & Richardson P.C.

(57) ABSTRACT

A Raman spectroscopy probe includes a lens tube and an objective lens positioned in the lens tube. The lens tube and the objective lens are composed of microwave transparent materials. A Raman spectroscopy system includes the Raman spectroscopy probe, a microwave reactor having a microwave reactor chamber, a susceptor crucible positioned in the microwave reactor chamber, and a sample crucible positioned in the susceptor crucible. An end of the lens tube is configured to be positioned in the microwave reactor chamber to face an opening of the sample crucible. The Raman spectroscopy system can further include an optics assembly.

20 Claims, 8 Drawing Sheets

(56) References Cited

U.S. PATENT DOCUMENTS

| | | | | |
|---|---|---|---|---|
| 4,214,371 | A * | 7/1980 | Bush | G02B 27/32 |
| | | | | 42/123 |
| 4,626,079 | A * | 12/1986 | Nakamura | G02B 21/10 |
| | | | | 359/728 |
| 2010/0209937 | A1* | 8/2010 | Geddes | G02B 21/16 |
| | | | | 435/7.1 |
| 2013/0146572 | A1* | 6/2013 | Watanabe | B23K 26/0648 |
| | | | | 219/121.72 |
| 2015/0216402 | A1* | 8/2015 | Ray | A61B 1/00096 |
| | | | | 600/109 |
| 2015/0303867 | A1* | 10/2015 | Angel | H10F 77/488 |
| | | | | 136/246 |
| 2019/0383727 | A1* | 12/2019 | Stewart | G01N 29/043 |
| 2020/0303736 | A1 | 9/2020 | Barsoum | |
| 2023/0037291 | A1 | 2/2023 | Birkel | |
| 2024/0085334 | A1 | 3/2024 | Birkel | |
| 2024/0247111 | A1 | 7/2024 | Birkel | |

OTHER PUBLICATIONS

Alumina 99.9%-100% | CoorsTek Technical Ceramics, https://www.coorstek.com/en/materials/technical-ceramics/alumina/alumina-999-100/, (accessed May 30, 2022), retrieved Jun. 16, 2025 4 pages.

B. García-Baños, J. J. Reinosa, F. L. Peñaranda-Foix, J. F. Fernández, J. M. Catalá-Civera, "Temperature Assessment of Microwave-Enhanced Heating Processes," Sci. Rep. 2019 9:10809, 10 pages.

B. Garcia-Baños, J. M. Catalá-Civera, F. L. Peñaranda-Foix, P. Plaza-González, G. Llorens-Vallés, "In Situ Monitoring of Microwave Processing of Materials at High Temperatures through Dielectric Properties Measurement," Materials (Basel). 2016, 9 (349): 1-10.

B. Panzarella, G. Tompsett, W. C. Conner, K. Jones, "In Situ SAXS/WAXS of Zeolite Microwave Synthesis: NaY, NaA, and Beta Zeolites," ChemPhysChem 2007, (8)357: 357-369.

C. Mastrovito, J. W. Lekse, J. A. Aitken, J. "Rapid solid-state synthesis of binary group 15 chalcogenides using microwave irradiation," Solid State Chem. 2007, 180, 3262-3270.

D. A. H. Hanaor, C. C. Sorrell, "Review of the anatase to rutile phase transformation," J. Mater. Sci. 2010 464 2010, 46, 855-874.

D. K. Agrawal, "Microwave processing of ceramics," Curr. Opin. Solid State Mater. Sci. 1998, 3, 480-485.

D. R. Baghurst, A. M. Chippindale, D. M. P. Mingos, " Microwave syntheses for superconducting ceramics," Nature 1988, 332, 311.

D. S. Wragg. P. J. Byrne, G. Giriat, B. Le Ouay, R. Gyepes, A. Harrison, A. G. Whittaker, R. E. Morris, J. Phys. Chem. C 2009, 113, 20553.

E. E. Levin, J. H. Grebenkemper, T. M. Pollock, R. Seshadri, "Protocols for High-Temperature Assisted-Microwave Preparation of Inorganic Compounds," Chem. Mater. 2019, 31, 7151.

E. Pert, Y. Carmel, A. Birnboim, T. Olorunyolemi, D. Gershon, J. Calame, I. K. Lloyd, O. C. Wilson, ""Temperature Measurements during Microwave Processing: The Significance of Thermocouple Effects,"" J. Am. Ceram. Soc. 2001, 84, 1981-86.

G. A. Tompsett, B. Panzarella, W. C. Conner, K. S. Yngvesson, F. Lu, S. L. Suib, K. W. Jones, S. Bennett, Rev. Sci. Instrum. 2006, 77, 124101.

G. Gouadec, P. Raman Spectroscopy of Nanomaterials: How Spectra Relate to Disorder, Particle Size and Mechanical Properties, Colomban, Prog. Cryst. Growth Charact. Mater., 2007, 53, 1-56.

H. J. Kitchen, S. R. Vallance, J. L. Kennedy, N. Tapia-Ruiz, L. Carassiti, A. Harrison, A. G. Whittaker, T. D. Drysdale, S. W. Kingman, D. H. Gregory, "Modern Microwave Methods in Solid-State Inorganic Materials Chemistry: From Fundamentals to Manufacturing," Chem. Rev., 2014, 114, 1170-1206.

H. X. Yang, C. J. Nie, Y. G. Shi, H. C. Yu, S. Ding, Y. L. Liu, D. Wu, N. L. Wang, J. Q. Li, "Structural Phase Transitions and Sodium Ordering in Na0.5CoO2: a Combined Electron Diffraction and Raman Spectroscopy Study," Solid State Commun. 2005, 134, 403.

J. C. Jamieson, B. Olinger, "Pressure-Temperature Studies OI Anatase, Brookite Rutile, and TiO,(II): A Discussion," Am. Mineral. 1969, 54, 1477-1481.

J. D. Katz, "Microwave Sintering of Ceramics," Annu. Rev. Mater. Sci. 1992, 22, 153-170.

J. Menéndez, M. Cardona, "Temperature dependence of the first-order Raman scattering by phonons in Si, Ge, and a-Sn: Anharmonic effects," Phys. Rev. B 1984, 29, 2051, 9 Pages.

J. Thapa, B. Liu, S. D. Woodruff, B. T. Chorpening, M. P. Buric, "Raman Scattering in Single-Crystal Sapphire at Elevated Temperatures" Appl. Opt. 2017, 56, 8598, 10 pages.

J. W. Lekse, T. J. Stagger, J. A. Aitken, "Microwave Metallurgy: Synthesis of Intermetallic Compounds via Microwave Irradiation," Chem. Mater. 2007, 19, 3601-3603.

J. Yao, Z. Fan, Y. Jin, Y. Zhao, H. He, J. Shao, "Investigation of damage threshold to TiO2 coatings at different laser wavelength and pulse duration," Thin Solid Films 2008, 516, 1237-1241.

Jha, P. K.; Troper, A.; Da Cunha Lima, I. C.; Talati, M.; Sanyal, S. P. Phonon Properties of Intrinsic Insulating Phase of the Cobalt Oxide Superconductor NaCoO2. Phys. B Condens. Matter 2005, 366 (1-4), 153-161. https://doi.org/10.1016/j.physb.2005.05.030.

K. Biswas, S. Muir, M. A. Subramanian, "Rapid Microwave Synthesis of Indium Filled Skutterudites: An energy efficient route to high performance thermoelectric materials," Mater. Res. Bull. 2011, 46, 2288.

K. J. Rao, B. Vaidhyanathan, M. Ganguli, P. A. Ramakrishnan, "Synthesis of Inorganic Solid Using Microwaves," Chem. Mater. 1999, 11, 882.

K. Phiwdang, S. Suphankij, W. Mekprasart, W. Pecharapa, "Synthesis of CuO Nanoparticles by Precipitation Method Using Different Precursors," Energy Procedia. 2013, 34, 740-745.

Lei, Y.; Li, X.; Liu, L.; Ceder, G. Synthesis and Stoichiometry of Different Layered Sodium Cobalt Oxides. Chem. Mater. 2014, 26 (18), 5288-5296. https://doi.org/10.1021/cm5021788.

Levin, E. E.; Grebenkemper, J. H.; Pollock, T. M.; Seshadri, R. Protocols for High Temperature Assisted-Microwave Preparation of Inorganic Compounds. Chem. Mater. 2019, 31 (18), 7151-7159. https://doi.org/10.1021/acs.chemmater.9b02594.

M. M. Günter, C. Korte, G. Brunauer, H. Boysen, M. Lerch, E. Suard, "In Situ High Temperature Neutron Diffraction Study of Sr/Mg-doped Lanthanum Gallate Superionic Conductors under Microwave Irradiation." Zeitschrift Anorg. Und Allg. Chemie. 2005, 631, 1277-1284.

M. Nakayama, "Grain size control of LiMn2O4 cathode material using microwave synthesis method," Solid State Ionics 2003, 164, 35-42.

R. D. Shannon, J. A. Pask, "Kinetics of the Anatase-Rutile Transformation," J. Am. Ceram. Soc. 1965, 48, 391, 56 pages.

R. Killick, P. Fearnhead, I. A. Eckley, "Optimal detection of changepoints with a linear computational cost," J. Am. Stat. Assoc. 2012, 107, 1590, 25 pages.

Raman Spectroscopy | Confocal Raman Spectroscopy | Edinburgh Instruments https://www.edinst.com/techniques/raman-spectroscopy/ (accessed Sep. 22, 2020).

S. Osswald, V. N. Mochalin, M. Havel, G. Yushin, Y. Gogotsi, "Phonon Confinement Effects in the Raman Spectrum of Nanodiamond," Phys. Rev. B—Condens. Matter Mater. Phys. 2009, 80, 075419, 10 pages.

S. Sandell, E. Chávez-Ángel, A. El Sachat, J. He, C. M. Sotomayor Torres, J. Maire, J. "Thermoreflectance techniques and Raman thermometry for thermal property characterization of nanostructures," Appl. Phys. 2020, 128, 131101, 1-25.

S. Tsubaki, T. Matsuzawa, E. Suzuki, S. Fujii, Y. Wada, "Operando Raman Spectroscopy of the Microwave-Enhanced Catalytic Dehydration of 2-Propanol by WO3," Ind. Eng. Chem. Res. 2020, 59, 1781-1788.

Ś. Vaucher, J. M. Catala-Civera, A. Sarua, J. Pomeroy, M. Kuball, J. "Phase selectivity of microwave heating evidenced by Raman spectroscopy," Appl. Phys. 2006, 99, 113505, 5 pages.

S. Vaucher, M. Stir, K. Ishizaki, J. M. Catala-Civera, R. Nicula, "Reactive synthesis of Ti—Al intermetallics during microwave heating in an E-field maximum," Thermochim. Acta 2011, 522, 151-154.

(56) References Cited

OTHER PUBLICATIONS

S. Vaucher, R. Nicula, J. M. Català-Civera, B. Schmitt, B. Patterson, "In situ synchrotron radiation monitoring of phase transitions during microwave heating of Al—Cu—Fe alloys," J. Mater. Res. 2008, 23, 170-175.

S. W. Muir, O. D. Rachdi, M. A. Subramanian, "Rapid microwave synthesis of the iron arsenides NdFeAsO and NdFe0.9Co0.1AsO," Mater. Res. Bull. 2012, 47, 798-800.

Shacklette, L. W.; Jow, T. R.; Townsend, L. Rechargeable Electrodes from Sodium Cobalt Bronzes. J. Electrochem. Soc. 1988, 135 (11), 2669-2674.

T. R. Hart, R. L. Aggarwal, B. Lax, "Temperature Dependence of Raman Scattering in Silicon," Phys. Rev. B 1970, 1, 638-642.

Thapa, J.; Liu, B.; Woodruff, S. D.; Chorpening, B. T.; Buric, M. P. Raman Scattering in Single-Crystal Sapphire at Elevated Temperatures. Appl. Opt. 2017, 56 (31), 8598, 10 pages.

U. Balachandran, N. G. Eror, "Raman Spectra of Titanium Dioxide," J. Solid State Chem. 1982, 42, 276-282.

Whittaker, D. M. P. Mingos, "Microwave-assisted Solid-state Reactions involving Metal Powders," J. Chem. Soc. Dalt. Trans. 1995, 2073-2079.

\* cited by examiner

RAMAN SPECTROSCOPY SYSTEM FOR EXTREME CONDITIONS

CROSS-REFERENCE TO RELATED APPLICATION

This application claims the benefit of U.S. Patent Application No. 63/405,181 filed on Sep. 9, 2022, which is incorporated herein by reference in its entirety.

TECHNICAL FIELD

This invention relates to Raman spectroscopy systems and methods for the measurement of chemical reactions and phase transitions in extreme conditions (e.g., exposure to microwave radiation and high temperatures).

BACKGROUND

Microwave heating has been increasingly adopted for the preparation of inorganic materials. In microwave heating, electromagnetic radiation is directly converted to thermal energy within the material or a secondary susceptor. In contrast, conventional (furnace) heating relies on propagation of thermal energy from external sources such as resistive heating elements. Comparatively, microwaves permit rapid heating rates and potentially selective heating of reactants.

SUMMARY

This disclosure describes methods and in situ Raman measurement system developed for the monitoring and direct comparison of solid-state transformations under conventional (furnace) heating and non-conventional microwave heating. A microwave compatible Raman probe capable of measuring inside commercially available, general-use laboratory microwave ovens is integrated into an in situ Raman measurement system. The system allows monitoring of the phase transition and with that enables comparison of conventional and microwave methods for high temperature, solid-state transformations. This provides a useful tool for understanding and controlling microwave processing of inorganic materials, especially in routine syntheses in the laboratory setting.

In a first general aspect, a Raman spectroscopy probe includes a lens tube and an objective lens positioned in the lens tube. The lens tube and the objective lens comprise or are composed of microwave transparent materials.

Implementations of the general aspect include one or more of the following features.

The lens tube is typically cylindrical or cuboid. A length of the lens tube is typically in a range of about 100 mm to about 500 mm. In some examples, the lens tube comprises or is composed of alumina. In some examples, the objective lens comprises or is composed of borosilicate glass.

An interior surface of the lens tube is threaded. A lock ring positioned inside or configured to be positioned inside the lens tube. An exterior surface of the lock ring is threaded. The threaded exterior surface of the lock ring is configured to engage the threaded interior surface of the lens tube. The lock ring is configured to secure the objective lens in the lens tube. In some cases, the lock ring is in contact with (e.g., in direct contact with) the objective lens. The Raman spectroscopy probe typically includes an additional lock ring, wherein an exterior surface of the additional lock ring is threaded, and the threaded exterior surface of the additional lock ring is configured to engage the threaded interior surface of the lens tube. The additional lock ring is configured to inhibit motion of the objective lens relative to the lens tube. The lock ring and the additional lock ring comprise or are composed of microwave transparent material (e.g., alumina).

The Raman spectroscopy probe can further include an optics assembly coupled to or configured to be coupled to an exterior of the lens tube. In one example, the optics assembly includes a fiber optic bundle, a signal fiber lens positioned opposite the fiber optic bundle, an edge filter positioned opposite the signal fiber lens, and a dichroic filter positioned opposite the edge filter.

In a second general aspect, a Raman spectroscopy system includes the Raman spectroscopy probe of the first general aspect, a microwave reactor comprising a microwave reactor chamber, a susceptor crucible positioned in the microwave reactor chamber, and a sample crucible positioned in the susceptor crucible. An end of the lens tube is configured to be positioned in the microwave reactor chamber to face an opening of the sample crucible.

Implementations of the second general aspect may include one or more of the following features.

In some cases, the Raman spectroscopy system includes a microwave field-blocking access port. The Raman spectroscopy probe is configured to be positioned in the microwave reactor chamber through the microwave field-blocking access port.

The Raman spectroscopy system can include an optics assembly. In one example, the optics assembly includes a fiber optic bundle, a signal fiber lens positioned opposite the fiber optic bundle, an edge filter positioned opposite the signal fiber lens, and a dichroic filter positioned opposite the edge filter. The optics assembly is coupled or configured to be coupled to an exterior portion of the lens tube and configured to be external to the microwave reactor.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIGS. 7A and 7B show the temperature profiles and Raman intensity surface plots of the transition with the dominant identified phases indicated by anatase and rutile shaded areas. The shaded areas between the anatase and rutile areas indicate the transition where both phases are detected. FIG. 7A is from the furnace test with temperature measured by sample thermocouple indicated by "TC". FIG. 7B is from the analogous microwave test.

FIGS. 8A and 8B show test results for a furnace heating experiment and microwave heating experiment, respectively. FIGS. 8A (left) and 8B (left) show selected Raman spectra. The maximum intensities are indicated on each axis and time in seconds indicated inside each plot. FIGS. 8A (right) and 8B (right) show the normalized intensity evolution of the wavenumber positions indicated (A-152 $cm^{-1}$ for anatase $TiO_2$, R-393 $cm^{-1}$ and R-592 $cm^{-1}$ for rutile $TiO_2$). Dashed lines indicate the linear change-points.

DETAILED DESCRIPTION

Raman spectroscopy is advantageous for in situ studies of microwave heating of inorganics. It probes the vibrational energy levels in solids and molecules by collecting inelastically scattered photons from a monochromatic excitation source (e.g., a laser). The technique provides non-contact and generally unambiguous phase identification in Raman active solids. Other chemical and physical properties of samples (e.g., composition, temperature, strain) can be determined by a more detailed analysis of Raman spectra.

This disclosure describes a Raman measurement system for observing inorganic transformations under both furnace heating and microwave heating in situ. The described probe and measurement system can be used in commercially available, general-use laboratory microwave ovens. The probe has a long working distance and is made of one or more microwave transparent materials. As used herein, a "microwave transparent" material generally refers to a material with a dielectric loss tangent of about 0.01 or less and a microwave penetration depth of about 1 m or greater. Examples of microwave transparent materials include alumina, fused quartz, borosilicate glass, polytetrafluoroethylene (PTFE), Teflon®, Mullite, yttria stabilized zirconia, polyvinyl chloride (PVC), polystyrene, silicon, silicon nitride, silicon dioxide, and boron nitride. The Raman probe and measuring system allows the in situ monitoring of high temperature reactions and phase transitions (e.g., in the processing of inorganic materials).

Figure 1:
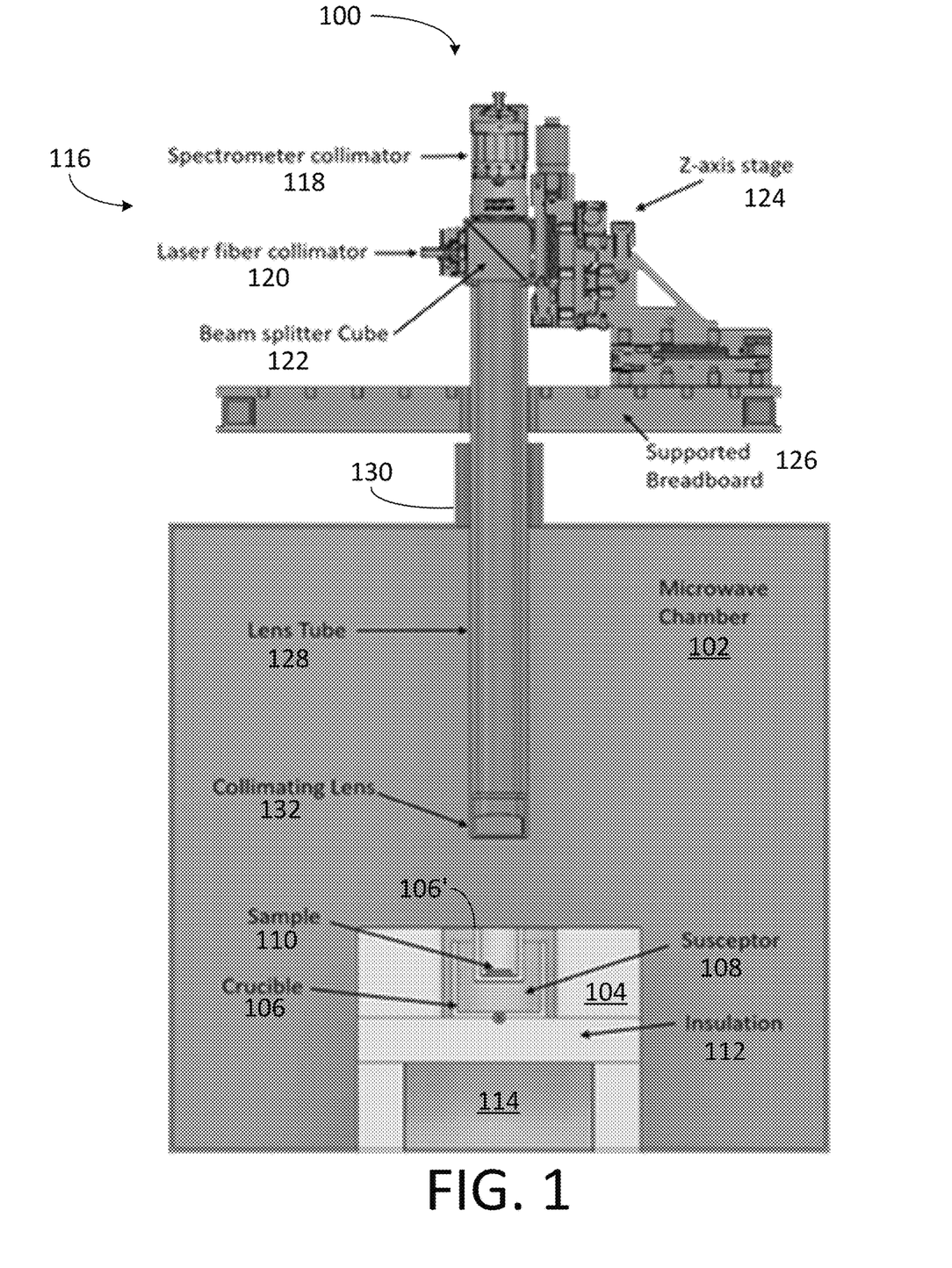
FIG. 1 depicts an experimental set-up for in situ Raman spectroscopy measurements during microwave heating.

FIG. 1 depicts system 100 for in situ Raman spectroscopy measurements during microwave heating. System 100 includes microwave reactor chamber 102. Microwave reactor chamber 102 includes cavity 104. Crucible 106 holds susceptor 108, and crucible 106' holds sample 110. Insulation 112 supports crucible 108 and separates crucible 108 from lower portion 114 of cavity 104. System 100 also includes spectrometer apparatus 116. Raman probe 116 includes spectrometer collimator 118, laser fiber collimator 120, and beam splitter cube 122 mounted on Z-axis stage 124, which is supported by breadboard 126. Lens tube 128 extends through microwave field-blocking access port 130 into microwave reactor chamber 102. Collimating lens 132 is positioned at a distal end of lens tube 128.

Figure 2A:
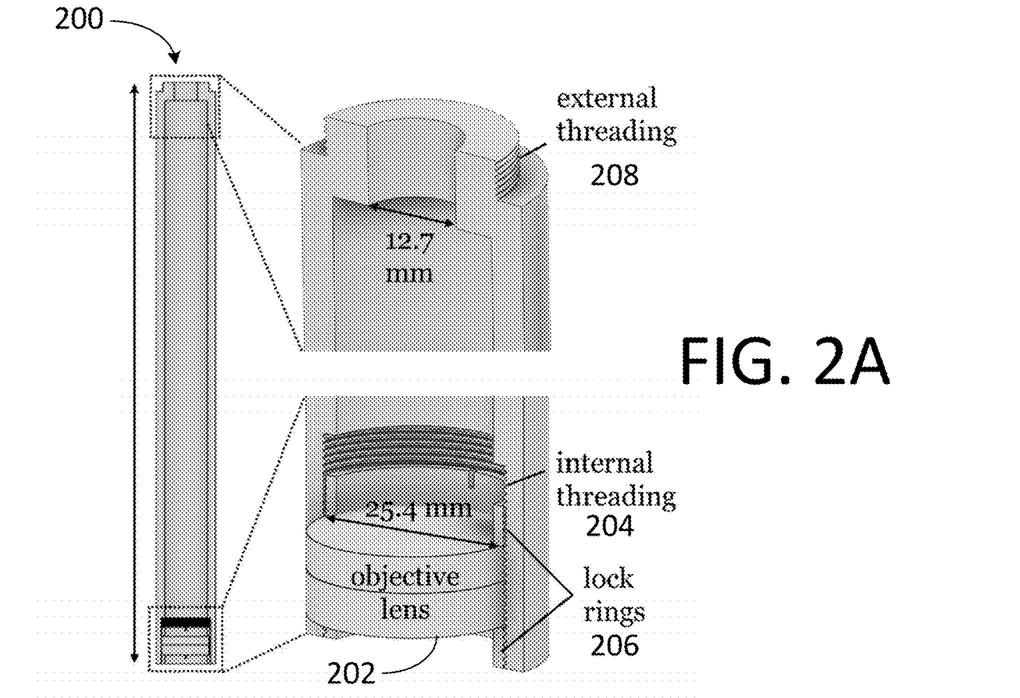
FIG. 2A is a schematic diagram of a Raman spectroscopy probe for use in a microwave reactor, including a microwave oven.

Raman probes as described herein can be used in commercially available microwave ovens and laboratory microwave reactors (e.g., the Mars 6 Synthesis microwave (CEM)). The microwave reactor includes a microwave field-blocking access port at the top of the reactor (e.g., with a minimum diameter of ~50 mm) for the probe design for the system disclosed herein. The probe is typically 100 mm to 500 mm in length. In one example, probe 200 is 300 mm in length. This length allows a portion of the probe to be positioned in the microwave reactor through an access port at the top and places the objective lens 202 close to the sample while keeping the other optics outside of the reactor. Probe 200 can accommodate 1-inch (25.4 mm) diameter optics that are secured in place by a length of internal threading 204 and lock rings 206. The external termination of the probe has standard external C-mount threading 208 which allows coupling to customizable optics. The lens tube and lock rings are formed from alumina. Objective lens 202 is formed from borosilicate glass. The alumina probe components were custom manufactured (Ortech Ceramics).

Figure 2B:
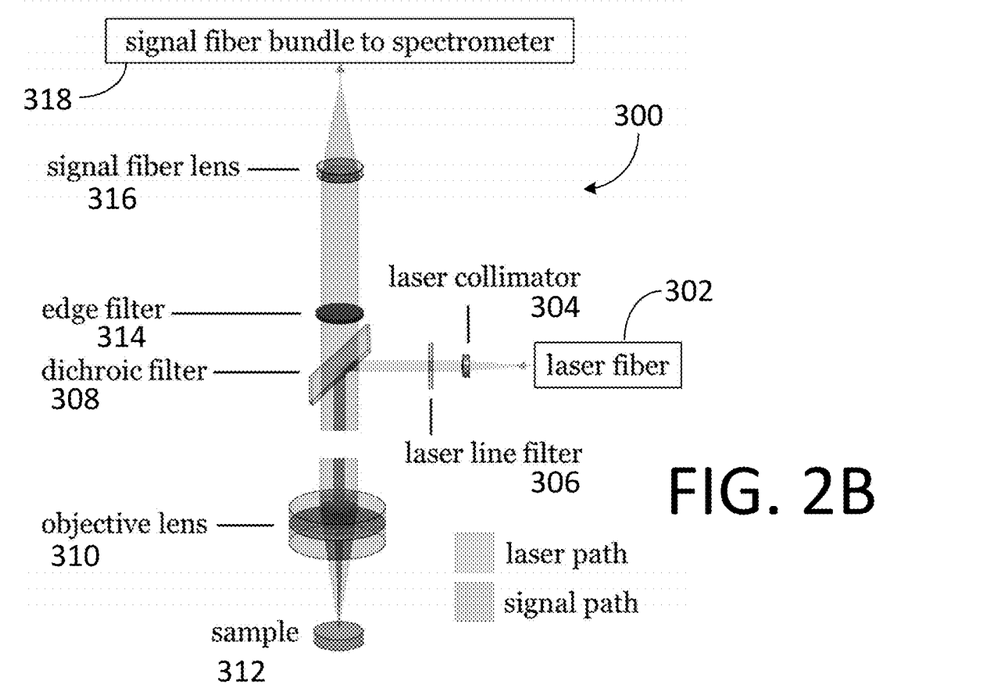
FIG. 2B is a schematic of the optical path in the probe.

FIG. 2B is a schematic showing the optical path 300 including optical components. Radiation from a laser (e.g., 532 nm CW, 100 mW, Samba 100, Hübner Photonics) is delivered by fiber optic 302 to an adjustable aspheric collimator 304 (e.g., PAF2P-18A, Thorlabs) which provides a ~3 mm diameter beam. The beam is passed through a cleanup filter 306 (e.g., Teledyne Princeton Instruments) and is reflected 90° by a dichroic filter 308 (e.g., Teledyne Princeton Instruments) to the objective lens 310 (e.g., AC254-150-A, Thorlabs) which both focus the laser on the sample 312 and collimates the collected Raman signal (i.e., backscattering configuration). The collimated signal beam returns back through dichroic filter 308 and low pass edge filter 314 (e.g., Teledyne Princeton Instruments). The signal beam is then focused by a precision Z-axis adjustable aspheric 316 (e.g., Teledyne Princeton Instruments) onto the bare termination of a fiber optic bundle 318 (e.g., 50-50 µm fibers, Teledyne Princeton Instruments) which is affixed in a precision XY stage (e.g., CP1XY, Thorlabs). In one example, the optical aperture is 10 mm. The optical aperture can be increased for more efficient collection by increasing the size of the probe's top opening and related optics. Referring to FIG. 2B, objective lens 310 and sample 312 are positioned in the microwave reactor. The remaining optical components are positioned outside the microwave reactor.

Figure 3A:
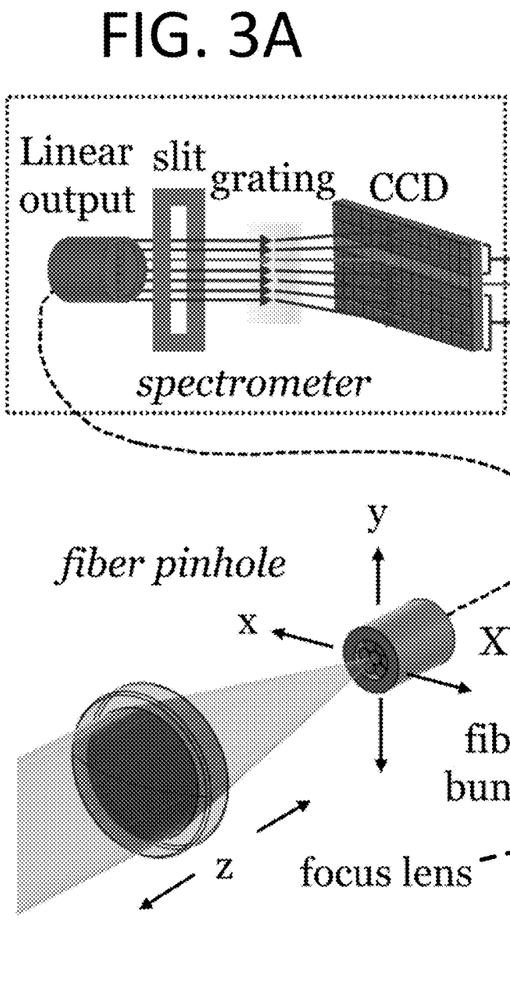
FIG. 3A is a schematic of fiber pinhole and binning.
Figure 3B:
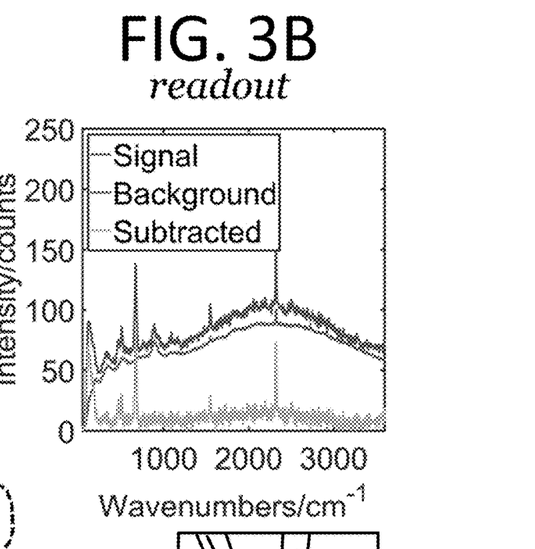
FIG. 3B shows the spectra obtained for a $Co_3O_4$ sample for signal fiber, background fibers, and the subtraction of the two.
Figure 3C:
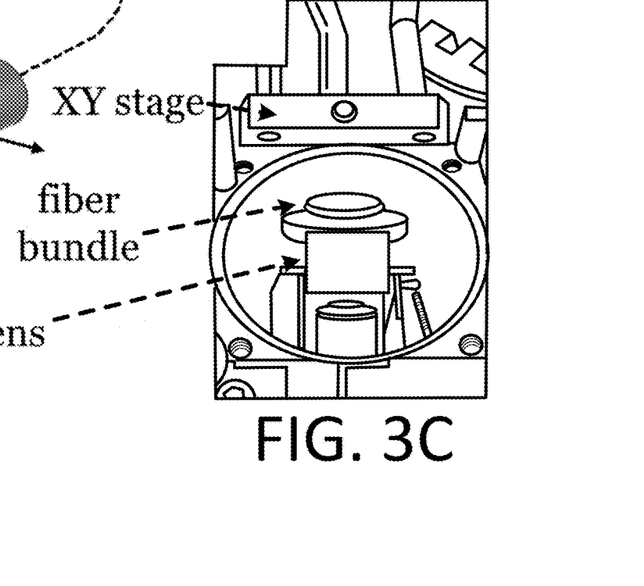
FIG. 3C is a photograph of fiber pinhole optics and hardware.

Referring to FIGS. 3A-3C, the lens and the fiber termination stage can be manually adjusted to focus the collimated signal beam onto a single fiber in the circular bundle. The fiber bundle output to the spectrometer is vertically linearized with respect to the dispersive grating and CCD detector camera. When the signal beam is focused on a single fiber, this arrangement creates a confocal "fiber pinhole" arrangement which effectively reduces collection of any radiation surrounding the laser spot from thermal emission, from which no Raman scattering information would be collected. This arrangement is advantageous for quality spectrum collection at high temperatures (>600° C.) where thermal radiation becomes intense. The signal pixel rows (e.g., totaling 6) corresponding to the laser-irradiated sample area and the remaining background pixel rows (e.g., totaling 219) corresponding to the non-irradiated area are binned separately and rescaled by their respective pixel counts. A background subtracted spectrum is then obtained by subtracting the background from the signal, which removes many instrumental (non-laser induced) artifacts. The background subtracted spectra can be used in the plots of the in situ data.

Figure 4A:
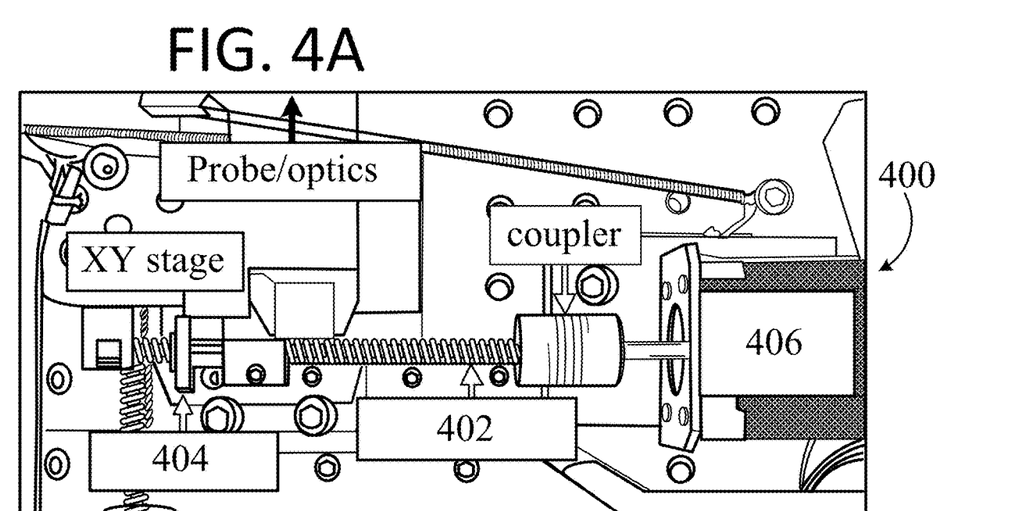
FIG. 4A is a photograph of raster scanning hardware.
Figures 4B, 4C:
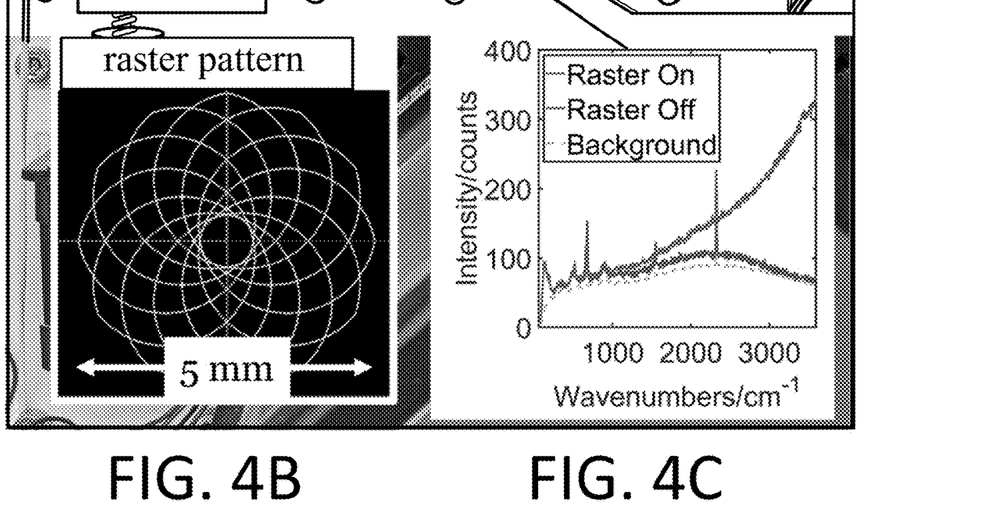
FIG. 4B shows an orbital rastering pattern adopted during measurements.
FIG. 4C shows a comparison of spectra obtained with raster on and raster off on a sample of $Co_3O_4$ at 185° C.

Laser induced heating is an important consideration in Raman spectroscopy. An advantageous feature of the fiber pinhole arrangement used here is the ability to compare the thermal background level (blackbody emission slope) of the signal spectrum to the background spectrum during the entire collection. The background collection area is not irradiated and does not undergo laser induced heating. When collecting on a stationary spot in dark opaque samples (e.g., $Co_3O_4$), significant heating due to the laser is observed. This is undesirable when attempting to representatively compare the effects of different heating methods. To address this, a mechanical raster scanning apparatus 400 can be configured to continuously move the probe, as shown in FIG. 4A. An adjustable XYZ stage (XR25P/M and XR25-YZ/M, Thorlabs) supports the optical assembly, where manual adjustment of the Z-axis micrometer moves the entire assembly vertically for fine focusing on the sample. The X and Y stage micrometer drives were removed and replaced by screw drives 402 and nuts 404 (e.g., CNC Inc.) actuated by microcontroller-controlled stepper motors 406 (e.g., Nema 17, Longrunner) to allow rapid scanning movement of the assembly. An automated continuous orbital raster pattern was applied which was 5 mm in total diameter, as shown in FIG. 4B. Each pattern cycle is completed in ~4.6 seconds. This reduced laser induced heating in $Co_3O_4$ samples as evidence by the plot shown in FIG. 4C. Significant laser heating was not observed in anatase $TiO_2$ samples without rastering, even at elevated sample temperatures (>900° C.), which may be due to the low intrinsic absorption of $TiO_2$ at the laser wavelength utilized. For this test, rastering was applied to reduce potential effects of laser heating during the conversion process. Rastering additionally provides a better bulk average analysis of the sample surface due to the small sampling volume. Minor variations in the area of sample surface selected may produce large spectral differences between sampling spots. By continuously moving during the collection, these discrepancies can be mitigated.

EXAMPLES

Figure 5A:
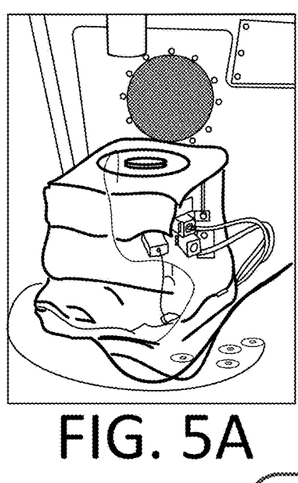
FIG. 5A is a photograph of tube furnace.
Figure 5B:
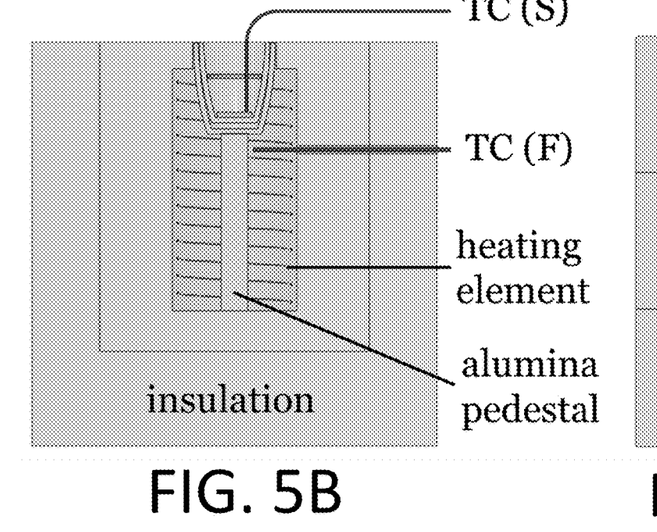
FIG. 5B is a schematic of tube furnace. TC (S)=sample thermocouple, TC (F)=furnace thermocouple.

Referring to FIGS. 5A and 5B, furnace heating experiments were performed with a small tube furnace (Superthal Mini MS 31, Kanthal) placed inside the microwave cavity, allowing measurements without moving or changing the instrument. The furnace was controlled using a PID temperature controller (3216, Eurotherm) and power controller (uF1HXTA0-16-L1000, Control Concepts) modulated by a furnace thermocouple (Type B, Carbolite) inserted into the center of the furnace. A calibration of the furnace setting to the temperature measured by the sample thermocouple (Type K, PerfectPrime) was performed to achieve the desired sample temperature.

Microwave experiments were performed using an insulation housing composed of aluminosilicate firebricks (Lynn Manufacturing) without any other modifications to the instrument. The firebricks were stacked to place the sample approximately in the center of the microwave cavity. In the top firebrick housing, a 50 mm diameter hole was drilled partway to create an enclosure which did not contact the sample/susceptor container. Referring to FIGS. 5D and 5E, a 38 mm diameter hole was drilled the rest of the way to provide optical access to the top surface of the sample by the Raman probe.

Figure 5C:
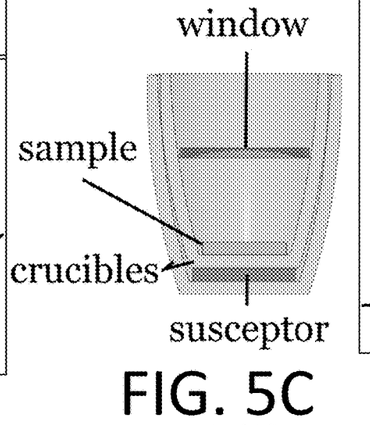
FIG. 5C is a schematic of sample/susceptor crucible assembly.
Figure 5D:
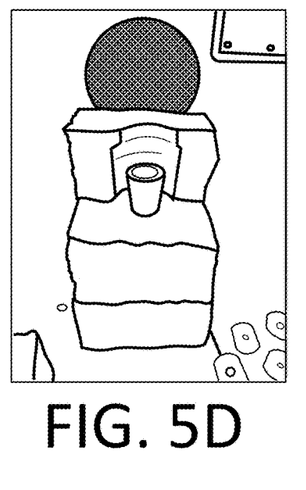
FIG. 5D is a photograph of a microwave housing with the insulation partially removed to show the crucibles.
Figure 5E:
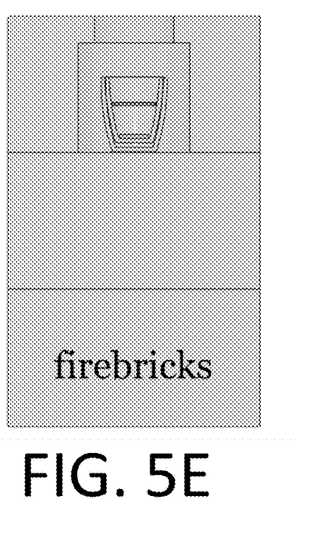
FIG. 5E is a schematic of the microwave insulation housing.

In both furnace and microwave heating methods, the sample container included an alumina sample crucible (AL-1005, Advalue Technology) nested inside a larger susceptor crucible (AL-1010, Advalue Technology), forming a flush semi-seal around the rim but with an open space beneath the sample crucible, as depicted in FIG. 5C. For microwave tests this open space was filled with a secondary microwave susceptor material: 3 g of natural $Fe_3O_4$ (94%, Alpha Chemicals). This facilitated the initiation of heating as $TiO_2$ does not heat efficiently under 2.45 GHz microwave irradiation at room temperature. $Fe_3O_4$ was chosen as the susceptor as it heats rapidly and does not release particulates (e.g., smoke) upon heating which would interfere with the optical path for Raman collection. A custom quartz optical window (AdValue Technology) with a diameter of 20 mm formed a loose seal within the sample crucible to retain heat while still allowing a clear optical path for Raman collections.

Figure 6A:
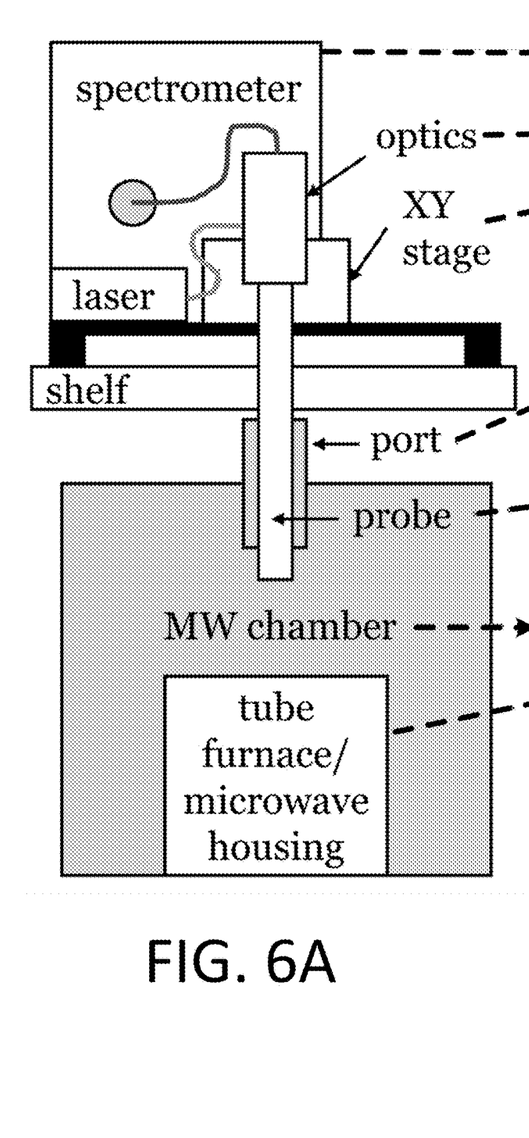
FIG. 6A is a schematic of the full system.
Figure 6B:
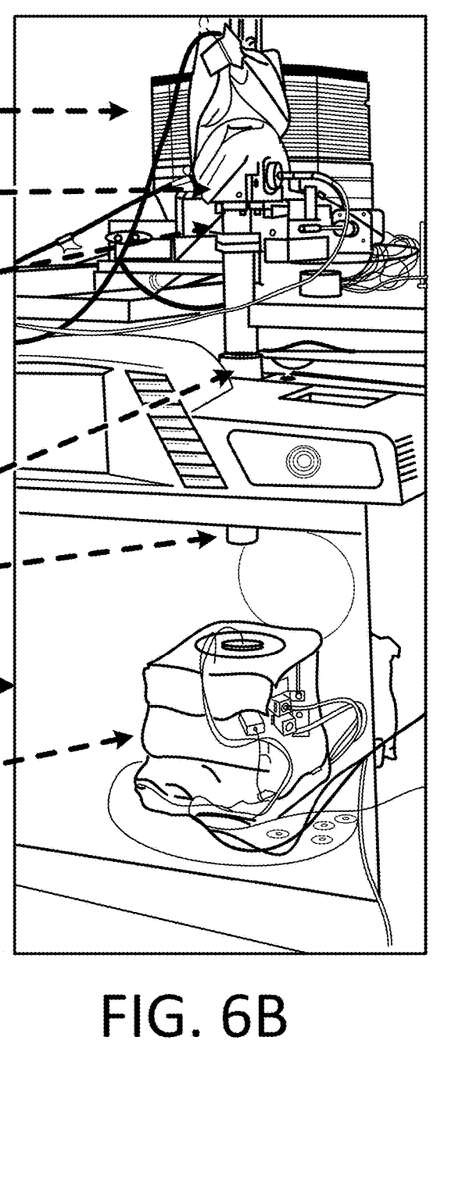
FIG. 6B is a photograph of the full system.

In furnace tests, the susceptor crucible was instead filled with SiC powder (Alfa Aesar) used only as a thermal transfer medium. These crucibles were supported by an alumina pedestal inside the furnace, forming a flush semi-seal between the furnace insulation opening and the crucibles at the top of the tube furnace. The temperature of the sample surface was measured by securing the sample thermocouple firmly onto the top of the sample and slightly outside of the laser scanning pattern. The temperature data were collected by computer using a USB temperature input device (USB-TC01, NI). In furnace tests, a similar 20 mm diameter quartz window was employed (AdValue Technology). This window however had a 1.2 mm diameter through hole 4.5 mm from the center of the window to allow insertion of the thermocouple and placement atop the sample. Referring to FIGS. 6A and 6B, the entire instrument was supported on a wall mounted shelf above the microwave reactor allowing the probe to enter through the top access port.

The furnace heating test was performed by increasing the temperature of the furnace at the maximum rate achievable. This resulted in a maximum heating rate of ~25° C./min measured at the sample surface. The temperature was held at ~855° C. for ~1 hour then allowed to cool naturally. The microwave heating test was performed by applying a constant power of 400 W for 40 minutes, after which the sample was allowed to cool naturally.

For each test, 0.5 g-325 mesh $TiO_2$ powder (>99%, Sigma Aldrich) with 1 mol % of nanoparticulate CuO (added to lower the transition temperature and time) prepared by a precipitation method was homogenized by grinding in an agate mortar and pressing into 13 mm diameter circular pellets (18 MPa, 1 minute). The nanoparticulate CuO was prepared by dissolving CuO (>99%, Sigma Aldrich) powder in 3M HCl (VWR) followed by precipitating with 3M NaOH (Fisher Chemical). The product was washed by repeated suspension in DI water and centrifugation (5×100 ml) followed by drying at 100° C. All preparations and phase transformations were performed in ambient air.

The spectrometer (FER-SCI-1024B X-VR, Teledyne Princeton Instruments) is equipped with a 1200 g/mm grating and a 1024×256 (w. by h.) CCD detector cooled to −55° C. It provides spectral resolution of at least 0.13 nm (~4 $cm^{-1}$). The laser power was fixed at 50 mW (50%) for all tests. Spectra collection, temperature collection, and raster scanning were synchronously implemented by computer control using MATLAB. One spectrum per second was collected with 490 ms total camera exposure time per spectrum. Post collection, 10 spectra were averaged to avoid periodic changes that could arise from the rastering pattern. No further smoothing was applied in the presented data.

To demonstrate the utility of the Raman probe for high-temperature studies under microwave and furnace heating conditions, measurements of the irreversible anatase-to-rutile phase transition in $TiO_2$ are presented. Microcrystalline anatase was used with 1 mol % nanoparticulate CuO added and the transformation was performed in air. The CuO additive lowers the temperature and increases the rate of the transformation, which facilitated the detection of the phase transformation at the temperatures employed. Due to the excitation wavelength used (532 nm), the Stokes Raman signals (collected at 533-555 nm) are masked by the intensity and fluctuations of thermal radiation at temperatures >900° C. Pure microcrystalline anatase does not undergo the phase transition at time scales <1 day until temperatures exceeding ~1000° C. are achieved, necessitating the use of the CuO additive.

Figure 7A:
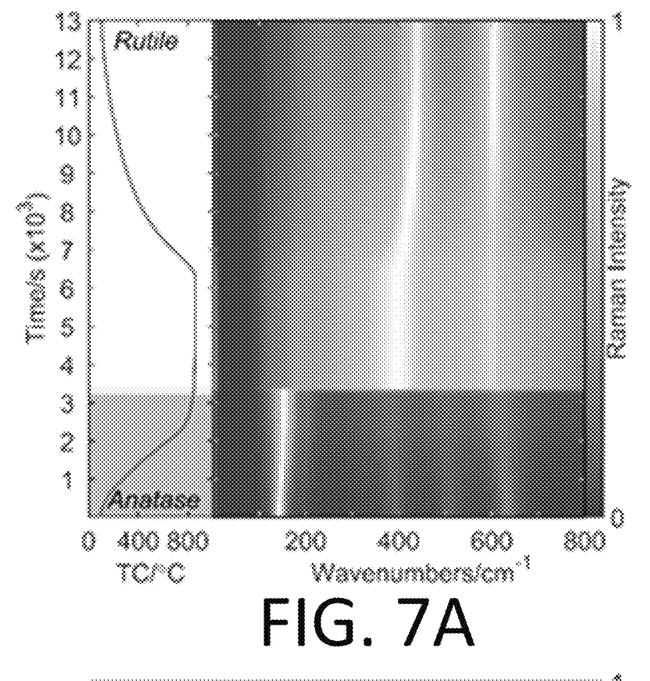
Figure 7B:
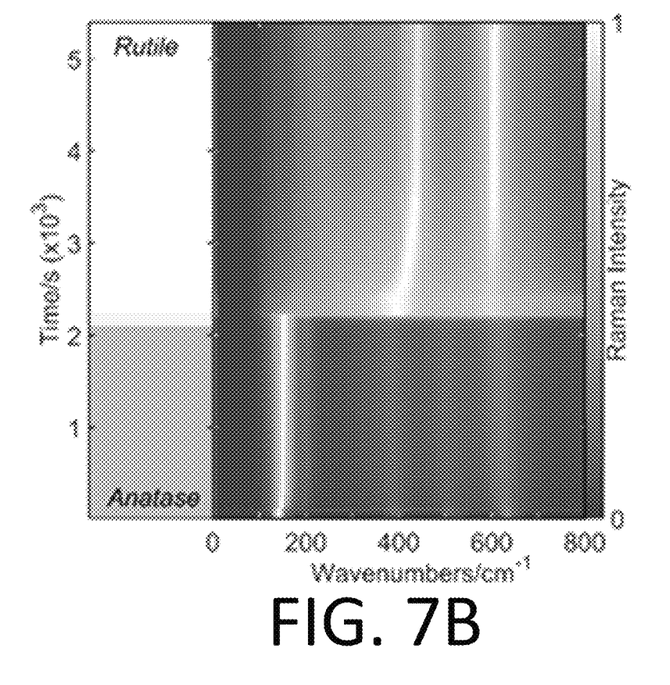

Two tests were performed to demonstrate the observation of the phase transition under both conventional (furnace) and microwave heating. Four Raman active modes can be clearly identified initially in anatase $TiO_2$ and two in rutile $TiO_2$ post transformation. No Raman active modes were observed for the CuO additive. Both methods resulted in full conversion as evidenced by X-ray powder diffraction data of the products. FIG. 7 shows the Raman intensity surfaces and the phases that could be identified by analysis of the individual spectra. The dominant phases during the heating process can be clearly distinguished.

Figure 8A:
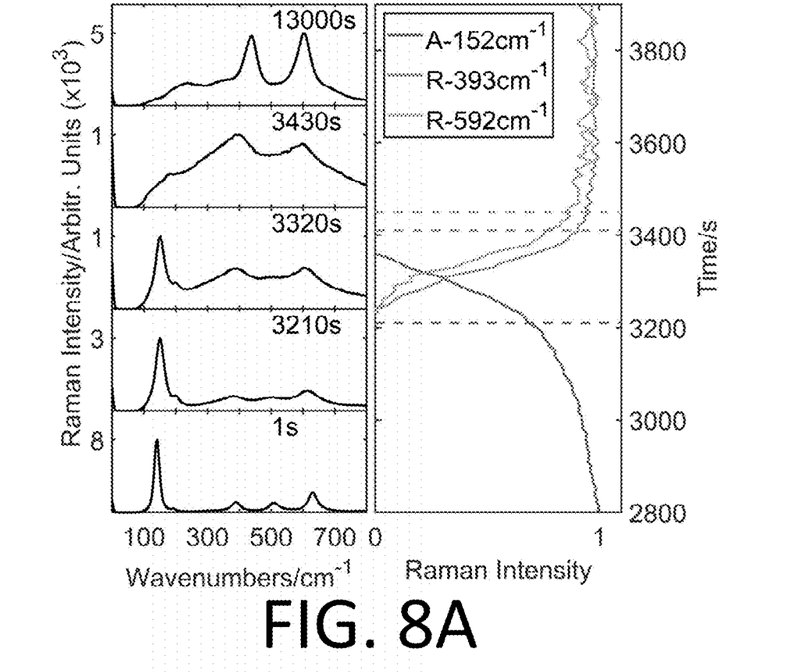
Figure 8B:
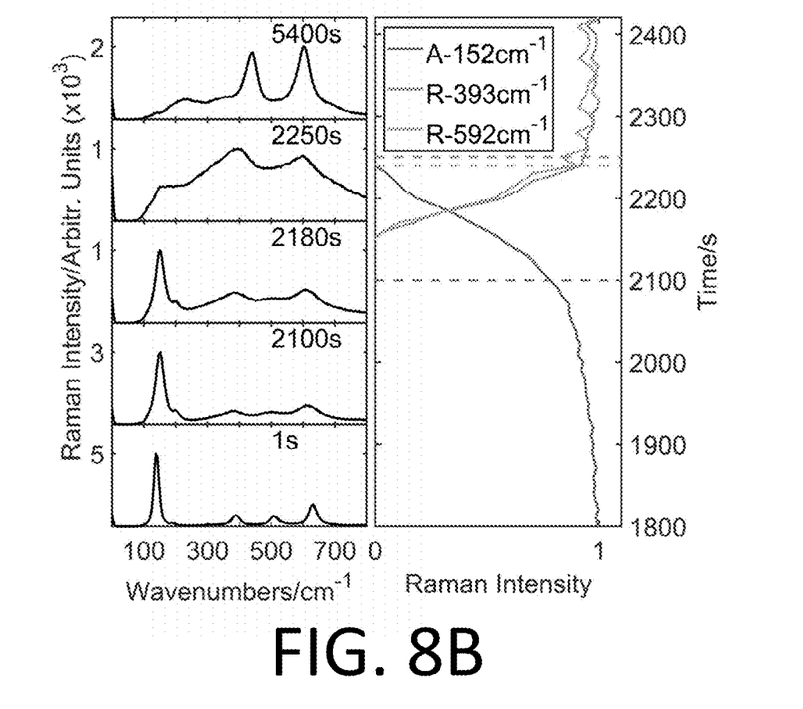

To estimate the outer bounds of the phase transition (initiation and completion) the evolution of Raman signal intensities as the phase transition occurs were examined. For this procedure, a single pixel's intensity (spanning ~4 $cm^{-1}$) at the approximate maximum of each peak was tracked over a limited time window encompassing the approach and recession of the transition. There is an obvious inflection point in the time dependence of the Raman peak intensities where the anatase peaks disappear and the rutile peaks appear. Using a linear change-point analysis method, an initiation and completion time of the phase transitions could be estimated (FIGS. 8A and 8B, right plots). This estimation procedure is simple and yields an objective approximation. The individual spectra obtained at these determined edges and within the transition (FIGS. 8A and 8B left plots) show that this procedure determined the detectable single- and multi-phase regions sufficiently.

The most intense anatase peak at ~152 $cm^{-1}$ yielded a good estimation while the remaining identified peaks were inconsistent. This is likely due to their reduced intensities and overlap with the appearing rutile peaks, and so these were not considered in estimating the initiation time. The two rutile peaks at ~393 $cm^{-1}$ and ~592 $cm^{-1}$ both gave fairly close transition completion times and were averaged. It is likely the actual transition process extends somewhat beyond these bounds. This analysis has utility in qualitatively comparing different heating methods with respect to the time taken to fully complete the transformation and does not rely on subjective visual inspection.

Under conventional heating, the transition takes approximately 220 s to complete. The temperatures measured at the surface by thermocouple give an initiation temperature of 843° C. and a completion temperature of 850° C. Under microwave heating the estimated time is reduced to 150 s. Temperature was not measured under microwave heating and so this reduction may be due to a higher temperature achieved before the initiation is detectable. The in situ Raman data collected clearly shows the time to achieve full conversion is reduced (furnace: 57 minutes, microwave: 37 minutes) presumably due to higher heating rates achieved.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A Raman spectroscopy probe comprising:
   a lens tube; and
   an objective lens positioned in the lens tube,
   wherein the lens tube and the objective lens comprise microwave transparent materials.

2. The Raman spectroscopy probe of claim 1, wherein the lens tube is cylindrical or cuboid.

3. The Raman spectroscopy probe of claim 2, wherein a length of the lens tube is in a range of about 100 mm to about 500 mm.

4. The Raman spectroscopy probe of claim 1, wherein the lens tube comprises alumina.

5. The Raman spectroscopy probe of claim 1, wherein the objective lens comprises borosilicate glass.

6. The Raman spectroscopy probe of claim 1, wherein an interior surface of the lens tube is threaded.

7. The Raman spectroscopy probe of claim 6, further comprising a lock ring positioned inside the lens tube.

8. The Raman spectroscopy probe of claim 7, wherein an exterior surface of the lock ring is threaded.

9. The Raman spectroscopy probe of claim 8, wherein the threaded exterior surface of the lock ring is configured to engage the threaded interior surface of the lens tube.

10. The Raman spectroscopy probe of claim 9, wherein the lock ring is configured to secure the objective lens in the lens tube.

11. The Raman spectroscopy probe of claim 10, wherein the lock ring is configured to contact the objective lens.

12. The Raman spectroscopy probe of claim 11, further comprising an additional lock ring, wherein an exterior surface of the additional lock ring is threaded, and the threaded exterior surface of the additional lock ring is configured to engage the threaded interior surface of the lens tube.

13. The Raman spectroscopy probe of claim 12, wherein the additional lock ring is configured to inhibit motion of the objective lens relative to the lens tube.

14. The Raman spectroscopy probe of claim 6, wherein the lock ring comprises a microwave transparent material.

15. The Raman spectroscopy probe of claim 14, wherein the microwave transparent material is alumina.

16. The Raman spectroscopy probe of claim 3, further comprising an optics assembly, the optics assembly comprising:

a fiber optic bundle;

a signal fiber lens positioned opposite the fiber optic bundle;

an edge filter positioned opposite the signal fiber lens; and a dichroic filter positioned opposite the edge filter, wherein the optics assembly is coupled to an exterior of the lens tube.

17. A Raman spectroscopy system comprising:

the Raman spectroscopy probe of claim 1;

a microwave reactor comprising a microwave reactor chamber;

a susceptor crucible positioned in the microwave reactor chamber; and a sample crucible positioned in the susceptor crucible, wherein an end of the lens tube is configured to be positioned in the microwave reactor chamber to face an opening of the sample crucible.

18. The Raman spectroscopy system of claim 17, further comprising a microwave field-blocking access port.

19. The Raman spectroscopy system of claim 18, wherein the Raman spectroscopy probe is configured to be positioned in the microwave reactor chamber through the microwave field-blocking access port.

20. The Raman spectroscopy system of claim 17, further comprising an optics assembly, the optics assembly comprising:

a fiber optic bundle;

a signal fiber lens positioned opposite the fiber optic bundle;

an edge filter positioned opposite the signal fiber lens; and a dichroic filter positioned opposite the edge filter, wherein the optics assembly is coupled to an exterior portion of the lens tube and configured to be external to the microwave reactor.

* * * * *